(12) United States Patent
Collins et al.

(10) Patent No.: US 11,157,938 B1
(45) Date of Patent: *Oct. 26, 2021

(54) SYSTEMS AND METHODS FOR REDEEMING REWARDS FOR CASH AT AN ATM FOR CREDIT ONLY CUSTOMERS

(71) Applicant: Wells Fargo Bank, N.A., San Francisco, CA (US)

(72) Inventors: Megan Collins, Westfield, NJ (US); Sarah W. Phelps, Annapolis, MD (US); Matthew S. Rogers, Hoboken, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/562,041

(22) Filed: Sep. 5, 2019

Related U.S. Application Data

(62) Division of application No. 15/393,882, filed on Dec. 29, 2016, now Pat. No. 10,521,814.

(51) Int. Cl.
*G06Q 30/00* (2012.01)
*G06Q 30/02* (2012.01)
(Continued)

(52) U.S. Cl.
CPC ..... *G06Q 30/0233* (2013.01); *G06Q 20/1085* (2013.01); *G06Q 20/4012* (2013.01);
(Continued)

(58) Field of Classification Search
None
See application file for complete search history.

(56) References Cited

U.S. PATENT DOCUMENTS 8,401,967 B1 3/2013 Postrel
8,690,051 B1 4/2014 Velline et al.
(Continued)

OTHER PUBLICATIONS

IP.com Search Strategy for U.S. Appl. No. 16/562,041 (Year: 2021).*

(Continued)

*Primary Examiner* — Matthew T Sittner
(74) *Attorney, Agent, or Firm* — Foley & Lardner LLP

(57) ABSTRACT

An automated teller machine (ATM) includes a network interface, an input/output device configured to exchange data with a customer, and a processing circuit comprising a processor and memory. The memory is structured to store instructions that are executable by the processor and cause the processing circuit to receive account information identifying a credit account associated with the customer, transmit the account information identifying the credit account, receive reward information associated with the credit account, display a reward indication notifying the customer of reward information and providing the customer with an ability to indicate a preference to perform a currency reward withdrawal, receive data comprising an indication of the preference of the customer to perform the currency reward withdrawal, transmit a redemption request based on the indicated preference, receive a redemption request authorization, and dispense an amount of currency corresponding to an amount identified in the redemption request authorization.

15 Claims, 7 Drawing Sheets

(51) Int. Cl.
  *G07F 7/10*   (2006.01)
  *G07F 19/00*  (2006.01)
  *G06Q 20/40*  (2012.01)
  *G06Q 20/10*  (2012.01)

(52) U.S. Cl.
  CPC ....... *G06Q 20/4014* (2013.01); *G07F 7/1025* (2013.01); *G07F 19/203* (2013.01)

(56) References Cited

U.S. PATENT DOCUMENTS

| | | | |
|---|---|---|---|
| 8,732,001 | B2 | 5/2014 | Previdi |
| 2001/0054003 | A1 | 12/2001 | Chien et al. |
| 2006/0010033 | A1 | 1/2006 | Thomas |
| 2007/0129955 | A1 | 6/2007 | Dalmia et al. |
| 2007/0205271 | A1* | 9/2007 | Gaillard .................. G07F 19/20 235/381 |
| 2008/0191006 | A1 | 8/2008 | White |
| 2010/0250355 | A1 | 9/2010 | Mcinnes et al. |
| 2010/0324923 | A1 | 12/2010 | Wilson |
| 2012/0209684 | A1 | 8/2012 | Postrel |
| 2012/0259698 | A1 | 10/2012 | Yurow |
| 2012/0303425 | A1* | 11/2012 | Katzin .................. G06Q 20/32 705/14.4 |
| 2013/0060694 | A1 | 3/2013 | Oskolkov et al. |
| 2013/0218657 | A1 | 8/2013 | Salmon et al. |
| 2014/0180802 | A1 | 6/2014 | Boal |
| 2014/0304056 | A1 | 10/2014 | Postrel |
| 2015/0032519 | A1 | 1/2015 | Brooks et al. |
| 2015/0324834 | A1 | 11/2015 | Postrel |
| 2016/0162893 | A1* | 6/2016 | Kamal .................. G06Q 20/405 705/44 |
| 2016/0321651 | A1 | 11/2016 | Douglas |
| 2017/0213418 | A1 | 7/2017 | Schwartz |
| 2018/0150900 | A1 | 5/2018 | Kurian et al. |

OTHER PUBLICATIONS

STIC EIC 3600 Search Report for parent U.S. Appl. No. 15/393,882 dated May 20, 2019 (similar subject matter). (Year: 2019).*
STIC EIC 3600 Search Report for U.S. Appl. No. 15/393,882 (related application with similar claims) dated May 20, 2019. (Year: 2019).*
IP.com Search Strategy dated Mar. 19, 2021. (Year: 2021).*
HDFC Bank, "Redemption Process," http://www.hdfcbank.com/personal/rewards/redemption_process?id=gts8mir9, downloaded Apr. 23, 2016. 1 page.

* cited by examiner

US 11,157,938 B1

SYSTEMS AND METHODS FOR REDEEMING REWARDS FOR CASH AT AN ATM FOR CREDIT ONLY CUSTOMERS

CROSS-REFERENCE TO RELATED APPLICATIONS

This application is a divisional of U.S. patent application Ser. No. 15/393,882 filed Dec. 29, 2016, which is incorporated herein by reference in its entirety.

TECHNICAL FIELD

The present invention relates generally to the field of delivery of financial rewards to customers of a financial institution.

BACKGROUND

Many issuers of credit cards offer rewards to customers. For example, some credit card issuers provide rewards for every dollar spent on a credit card. Accordingly, as a customer continues to use a rewards credit card, the customer accumulates rewards. After the customer has earned rewards, the customer can then redeem the rewards. Some financial institutions restrict how the accumulated rewards can be redeemed. For example, some rewards can only be redeemed in certain types of transactions (e.g., for certain types of products). In this regard, financial institutions and customers of those institutions may benefit from a system that enables customers to redeem financial rewards in a more convenient manner.

SUMMARY

A first example embodiment relates to an automated teller machine (ATM). The ATM includes a network interface, an input/output device configured to exchange data with a customer, and a processing circuit comprising a processor and memory. The memory is structured to store instructions that are executable by the processor and cause the processing circuit to receive, through the input/output device, credit account information identifying a credit account associated with the customer, transmit, through the network interface, the credit account information identifying the credit account, receive, through the network interface, financial reward information associated with the credit account, display a reward indication, through the input/output device, notifying the customer of customer reward information and providing the customer with an ability to indicate a preference to perform a currency reward withdrawal, receive data, through the input/output device, comprising an indication of the preference of the customer to perform the currency reward withdrawal, transmit, through the network interface, a financial reward redemption request based on the indicated preference, receive, through the network interface, a reward redemption request authorization, and dispense, through the input/output device, an amount of currency corresponding to an amount identified in the reward redemption request authorization.

In various arrangements, the indicated customer preference includes a portion of a financial reward amount identified in the financial reward information. In some arrangements, the ATM is further configured to receive data indicative of an interaction of the customer with the ATM through the input/output device and initiate a customer ATM session responsive to the data indicative of the interaction. The data indicative of the interaction can be tokenized and received from a computing device associated with the customer. The data indicative of the interaction can include an account number associated with the credit account.

In some arrangements, the ATM is configured to display an instruction for an input comprising authentication information, receive the authentication information, and generate a transaction request comprising the authentication information and the credit account information.

In some arrangements, the ATM is further configured to present a plurality of buttons. The plurality of buttons can include a reward redemption button structured to commence a reward redemption process, a reward balance inquiry structured to present financial award information, and a register additional cards button structured to commence a credit account registration process. In some arrangements, the ATM is further configured to register the credit account associated with the customer.

Another example embodiment relates to a computer-implemented method. The method includes receiving, by an automated teller machine (ATM), credit account information identifying a credit account associated with a customer, transmitting, by the ATM, the credit account information to a financial institution computing system, receiving, by the ATM, financial reward information associated with the credit account, displaying, by the ATM, a reward indication notifying the customer of the financial reward information and providing the customer with the ability to indicate a preference to perform a currency reward withdrawal, receiving, by the ATM, data comprising an indication of the preference of the customer to perform the currency reward withdrawal, transmitting, by the ATM, a financial reward redemption request based on the indicated preference, receiving, by the ATM, a reward redemption request authorization, and dispensing, by the ATM, an amount of currency corresponding to an amount identified in the reward redemption request authorization. In some arrangements, receiving, by the ATM, information involves receiving an account number associated with the credit account.

In some arrangements, the method includes displaying, by the ATM, an instruction for an input comprising authentication information, receiving, by the ATM, the authentication information, and generating, by the ATM, a transaction request comprising the authentication information and the credit account information.

In some arrangements, receiving, by the ATM, data comprising an indication of preference of customer involves receiving an indication of an amount of earned awards for redemption.

In various arrangements, the method further comprises generating a reward redemption request associated with the amount of earned awards for redemption.

In some embodiments, the method further includes receiving, by the ATM, data indicative of an interaction of the customer with the ATM through an input/output device and initiating, by the ATM, a customer ATM session responsive to the data indicative of the interaction. Receiving the data indicative of the interaction can include receiving, by the ATM, the data from a computing device associated with the customer and tokenizing, by the ATM, the data.

Yet another implementation of the present disclosure is a computer-implemented method. The method includes receiving, by an financial institution (FI) computing system, registration input comprising credit account information identifying a credit account and customer credentials associated with a customer, authenticating, by the FI computing system, the customer based on the customer credentials, transmitting, by the FI computing system, a registration interface responsive to the customer authentication, receiving, by the FI computing system, customer registration information, and associating, by the FI computing system, the received customer registration information with the credit account information.

In some arrangements, the method further involves determining, by the FI computing system, that the credit account was not previously registered based on the credit account information.

In some arrangements, the method further involves determining, by the FI computing system, that the credit account was previously registered based on the credit account information and transmitting, by the FI computing system, a notification.

In some arrangements, the method further includes identifying, by the FI computing system, one or more additional credit accounts associated with the customer and transmitting, by the FI computing system and for each of the one or more additional credit accounts, the registration interface.

In various arrangements, the method further includes receiving, by the FI computing system, data indicative of an interaction of the customer with an automated teller machine and initiating, by the FI computing system, a customer session responsive to the data indicative of the interaction.

DETAILED DESCRIPTION

Figure 1:
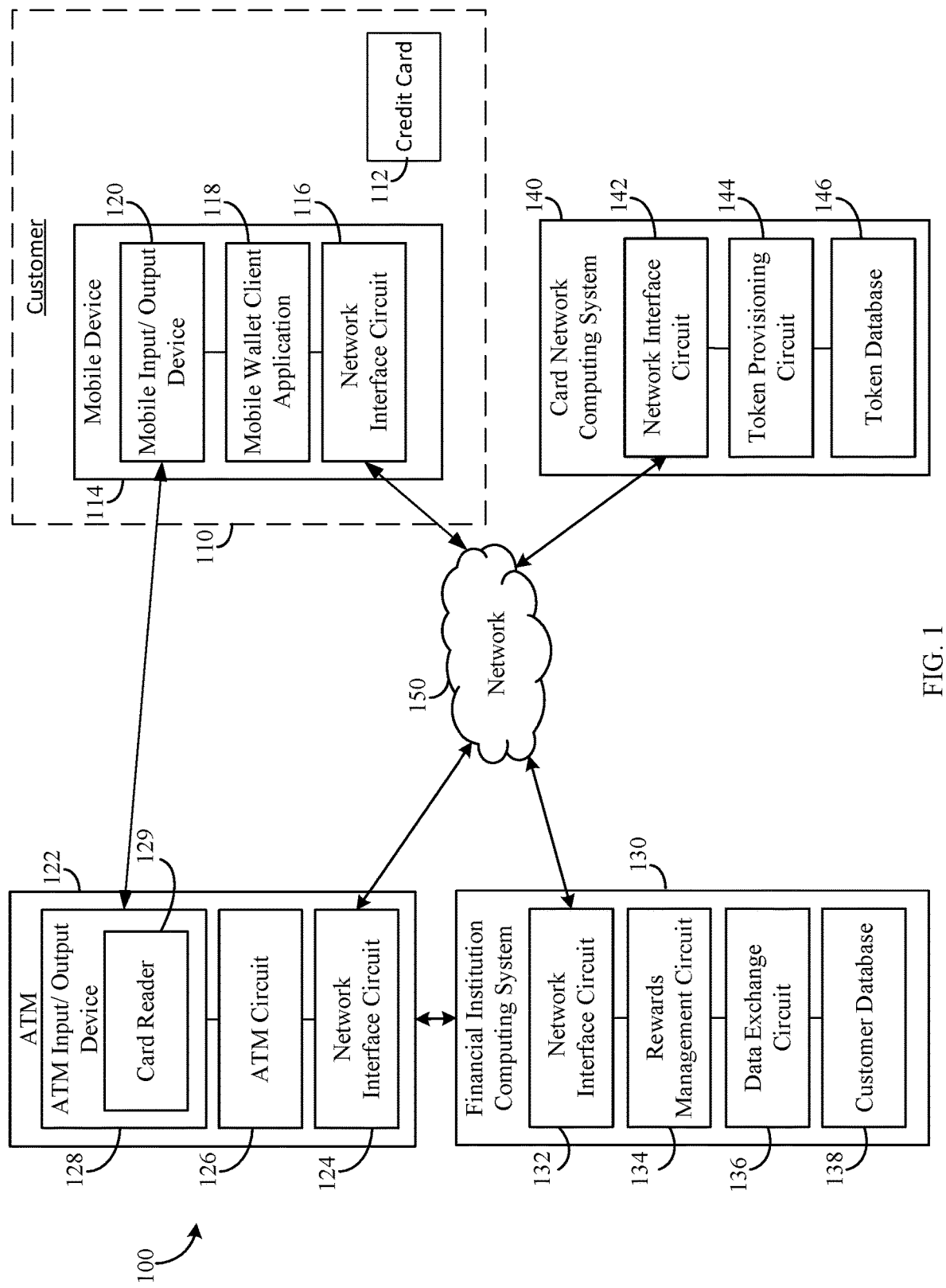
FIG. 1 is a schematic diagram of an environment of a customer according to an example embodiment.

Referring generally to the figures, various systems, methods, and apparatuses related to a financial reward redemption system structured to enable credit-only customers of a financial institution to withdraw financial rewards for cash via an Automated Teller Machine (ATM) are described.

According to various example embodiments, as described in further detail below, facilitating the cash withdrawal of financial rewards by credit-only customers via an ATM may incentivize credit-only customers to use a payment account associated with a financial institution to earn financial rewards. Unlike traditional arrangements, it is not necessary for the customer 110 to have a checking, debit, or any other type of account to have access to the ATM. Instead, using the system described herein, the credit-only customer can conveniently make cash withdrawals on a reward account associated with a credit card at an ATM. Beneficially, this system provides customer with convenient access to earned financial rewards.

In addition, embodiments described herein solve the technical problem of distributing cash rewards earned through a customer credit account via an ATM. This is addressed by associating customer ATM authentication data to customer credit financial reward information stored in a database associated with a financial institution computing system. This way, the customer can have access to ATMs associated with the financial institution to redeem a financial reward when the customer does not have any other account with the financial institution.

An example implementation may be described as follows. A customer approaches an ATM and inserts a credit card associated with a credit account held by the customer at a financial institution into the ATM. The contemplated financial reward redemption system is configured to determine whether the credit account has been registered for an ATM cash redemption program. Responsive to determining that the credit account is not registered, the contemplated financial reward redemption system is configured to enable the customer to register for the ATM cash redemption program. During the registration process, the customer is presented with a registration interface on an ATM that prompts the customer to input authentication information (e.g., a birthdate, social security number, or the like). The contemplated financial reward redemption system is configured to authenticate the customer based on the input information. The contemplated reward redemption system is further configured to enable the customer to establish credentials (e.g., a PIN) for the credit account. Thus, later on, the customer may approach an ATM, insert the credit card, and input the PIN. The contemplated financial reward redemption system is configured to authenticate the customer using the PIN, retrieve financial reward information associated with the credit account, and present the customer with a display giving the customer the ability to indicate a preference to redeem a financial reward for currency. Responsive to receiving such a preference, the contemplated financial reward redemption system is configured to dispense an amount currency that corresponds to a selection provided by the customer at the ATM.

Referring to FIG. 1, a block diagram of a reward redemption system 100 is shown according to an example embodiment. As will be described in further detail below, the reward redemption system 100 facilitates a customer 110 redeeming financial rewards associated with a credit card 112 for cash at an ATM 122. A financial institution computing system 130 receives information from the customer 110 via the ATM 122 to authenticate the customer 110 and identify financial rewards earned by the customer 110. The financial institution computing system 130 also converts an amount of earned rewards to a monetary value and causes the ATM 122 to dispense an amount of currency corresponding to the monetary value.

The customer 110 includes any customer of a financial institution associated with the financial institution computing system 130 who is or may be eligible to participate in the financial rewards program offered by the financial institution. The customer 110 has at least one financial rewards account at the financial institution that may be associated with a credit card 112 held by the customer 110 at the financial institution.

The reward redemption system 100 includes a card network computing system 140 associated with a card network, a financial institution computing system 130 associated with a financial institution, an ATM 122, and a mobile device 114 associated with the customer, whereby these components are communicably coupled to each other over a network 150. The network 150 provides communicable and operative coupling between the components described herein to provide and facilitate the exchange of communications (e.g., data, instructions, messages, values, commands, etc.). The network 150 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network includes the Internet. In some arrangements, the network 150 may further include a proprietary banking network (e.g., between the financial institution computing system 130 and the ATM 122) to provide secure or substantially secure communications.

The card network computing system 140 is a computing system associated with a card network. Examples of card networks include Visa®, MasterCard®, etc. The card network computing system 140 performs operations associated with the generation and issuance of payment card tokens. Payment card tokens are surrogate values that replace the primary account number ("PAN") associated with a payment card (e.g., the credit card 112), such as a credit card, debit card, ATM card, stored value card, etc. Payment card tokens can pass basic validation rules of an account number. Hence, in the case of a credit card, the payment card token for a given credit card "looks like" a real credit card number (e.g., a sixteen-digit number), but in fact is only a token. As part of a token generation process, steps are taken such that the generated payment card token does not have the same value as or otherwise conflicts with a real PAN (e.g., a real debit card number). A given payment card token may be provisioned to various locations for use in various types of scenarios, including ATMs for performing various financial operations, storage at a mobile device (e.g., a smartphone) for in-person or on-line transactions with a merchant, and so on.

The card network computing system 140 includes a network interface circuit 142, a token provisioning circuit 144, and a token database 146. The network interface circuit 142 enables the card network computing system 140 to exchange data over the network 150. As such, the network interface circuit 142 allows the card network computing system 140 to exchange data to remote computing devices (e.g., the financial institution computing system 130, the mobile device 114, etc.). The token database 146 is a storage medium retrievably storing token information (e.g., a token vault), and may include non-transient data storage mediums (e.g., local disc or flash-based hard drives, local network servers, and the like) or remote data storage facilities (e.g., cloud servers).

The token provisioning circuit 144 is configured to provision and manage tokens. In one aspect, the token provisioning circuit 144 can generate a new unique code to be provisioned as a token, and associate the token with a PAN (e.g., a PAN associated with the credit card 112 of the customer 110). Hence, in some embodiments, payment card tokens are generated by the card network computing system 140 and payment token-to-PAN mapping information is maintained in the token database 146. In another aspect, the token provisioning circuit 144 may be able to replace tokens as well as activate and deactivate tokens. The token provisioning circuit 144 may also be configured to associate permissions with each token, thereby allowing or disallowing the transmission or use of data associated with a given token.

For example, when a financial institution issues a credit card 112 having a PAN to a customer 110 having a mobile device 114 with a mobile wallet client application 118 implemented thereon, the card network computing system 140 may assign a payment token corresponding to the PAN and the mobile device 114 associated with the customer 110. In other words, the payment token can be used to identify the PAN and the mobile device 114. The PAN, the payment token, and information relating to their respective associations may be stored in the token database 146, thus enabling the customer 110 to engage in mobile wallet transactions using the mobile device, as will be described below.

The financial institution computing system 130 is a computing system associated with a financial institution (e.g., a bank, a credit card issuer, etc.). The financial institution computing system 130 includes a customer database, a rewards management circuit 134, a data exchange circuit 136, and a network interface circuit 132. The network interface circuit 132 is configured to allow the financial institution computing system 130 to exchange data over the network 150 (e.g., with the ATM 122, the mobile device, 114, and the card network computing system 140).

The customer database 138 is configured to retrievably store customer information relating to the various operations discussed herein, and may include non-transient data storage mediums (e.g., local disc or flash-based hard drives, local network servers, and the like) or remote data storage facilities (e.g., cloud servers). The customer database 138 includes personal customer information (e.g., names, addresses, phone numbers, and so on), identification information (e.g., PINs, social security numbers, driver's license numbers, biometric data, and so on), and customer financial information (e.g., account numbers, account balances, customer financial reward information, token information, available credit, credit history, transaction histories, and so on).

The payment token-to-PAN mapping information generated and stored at the card network computing system 140 discussed above may also be maintained at the customer database 138 at the financial institution computing system 130. As such, for example, the financial institution computing system 130 may provide additional token-related management services to customers that are not available through the card network computing system 140. Such services may be useful in situations where customers have multiple different types of accounts (e.g., multiple different types of credit cards, such that a single card network computer system does not have a global view of all of the payment tokens in existence for a given customer). Such services may be useful in situations where other information in addition to account numbers is tokenized by the financial institution computing system 130 or other computing systems, thereby creating tokens that are not payment tokens.

The data exchange circuit 136 is configured to exchange data among the customer database 138, the ATM 122, the mobile device 114, and the card network computing system 140. In one aspect, the data exchange circuit 136 may be configured to exchange tokens and permissions with the card network computing system 140, the ATM 122 (e.g., for authentication purposes) and the mobile device 114. The data exchange circuit 136 may also be configured to facilitate transactions involving the ATM 122 and the mobile device 114. In some arrangements, the data exchange circuit 136 is communicatively coupled to the mobile device 114 by an application (e.g., the mobile wallet client application 118 as will be described in greater detail below). Further, in some arrangements, the data exchange circuit 136 provides a payment token from the card network computing system 140 to the mobile wallet client application 118 over the network 150. The data exchange circuit 136 is also configured to cooperate with other components of the financial institution computing system 130 to authenticate and authorize various requests received from the ATM 122.

The rewards management circuit 134 is configured to process reward payment requests from the customer 110. In some arrangements, the rewards management circuit 134 is configured to perform all of the operations discussed above in relation to the data exchange circuit 136 in addition to performing other operations. Other operations that the rewards management circuit 134 is further configured to perform may include various account management functions, such as maintaining customer financial reward information in the customer database 138 (including, for example, updating reward balances and processing reward redemption requests by charging those requests to a rewards account). For example, when currency is redeemed by the customer 112 using the system described herein, the rewards management circuit 134 updates the associated rewards account by deducting from the account an amount of rewards that corresponds to the amount of currency redeemed by the customer 112 (e.g., the customer 112 redeems $100 and the rewards management circuit 134 updates the rewards account to reflect $100 worth of rewards less).

The ATM 122 is a computing system configured to provide an interface between a customer 110 and the financial institution computing system 130 allowing the customer 110 to access information at and perform transactions with the corresponding financial institution. For example, the ATM 122 may be configured to allow the customer 110 to view financial account balances, deposit checks, transfer funds, or withdraw funds from a given account in the form of cash. In one embodiment, the ATM 122 is configured to allow a customer to view financial rewards that they have earned through a credit account at the financial institution. The ATM 122 may be disposed at a brick and mortar banking facility associated with the financial institution, or may be a standalone computing terminal (e.g., disposed at an unrelated retail facility, within an office building, etc.).

The ATM 122 includes a network interface circuit 124 enabling the ATM 122 to exchange data over the network 150, an ATM circuit 126, and an ATM I/O device 128. Similar to the mobile I/O device 120, to be described below, the ATM I/O device 126 includes hardware and associated logics configured to enable the ATM 122 to exchange information with the customer 110 and the mobile device 114 (e.g., via corresponding hardware and logics at the mobile I/O device 120). In some arrangements, the ATM I/O device 128 also includes hardware and associated logics that enable the ATM 122 to dispense paper currency (e.g., cash) to the customer 110.

In some arrangements, the ATM I/O device 128 includes a card reader 129. The card reader 129 is configured to read a transaction card (e.g., the credit card 112) provided to the ATM 122 by the customer 110. In some arrangements, the card reader 129 reads the transaction card through a customer swiping action. For example, the customer 110 swipes the transaction card by passing the magnetic strip of the card through the card reader 129. In some arrangements, the card reader 129 reads the transaction card through a customer dipping action. For example, the customer 110 dips the transaction card by quickly inserting and removing the transaction card from the card reader 129. In some arrangements, the card reader 129 is configured to read the transaction card through a customer inserting action. For example, the customer inserts the transaction card fully into the card reader 129 and the card remains inserted into the card reader 129 for the duration of a transaction sequence at the ATM 122. In instances where the transaction card includes a smart chip, the customer 110 may be prompted to insert the card such that the card reader 129 can make contact with the smart chip for a period of time to read the smart chip. In some arrangements, the card reader 129 includes an NFC transceiver configured to receive transaction card information (e.g., a payment token) from the mobile device 114.

In some arrangements, the customer 110 inserts the credit card 112 into the card reader 129 of the ATM I/O device 128, which reads the credit card 112 to obtain credit card information (e.g., an account number). The credit card information may then be communicated by the card reader 129 to the ATM circuit 126, which, as will be described below, transmits the credit card information to the financial institution computing system 130. The ATM circuit 126 is further configured to receive an authentication prompt from financial institution computing system 130 to be displayed (e.g., via a display included in the ATM I/O device 128) on the ATM 122. For example, the financial institution computing system 130 transmits an authentication prompt including a request for a PIN from the customer 110. If the customer 110 (e.g., via a keyboard included on the ATM I/O device 128) inputs the requested pin, the credit card 112 card is authenticated. Once the credit card 112 is authenticated, the customer 110 is authorized to complete reward transactions (e.g., a currency reward withdrawal) at the ATM 122 using the credit card 112, as described further herein.

The ATM circuit 126 is configured to enable the customer 110 to interface with the financial institution computing system 130. The ATM circuit 126 exchanges information between the customer 110 via the mobile device 114, the financial institution computing system 130, and the card network computing system 140. For example, the ATM circuit 126 may be configured to collect authentication information (e.g., a token and a PIN) from the mobile device 114 through a mobile wallet client application 118 as will be described below, and send the authentication information to the financial institution computing system 130 and/or the card network computing system 140 over the network 150. Further, the ATM circuit 126 may be configured to receive an authentication confirmation from the financial institution computing system 130 and allow the customer to create financial reward operation requests. Such financial reward operation requests may include, for example, reward balance inquiries, cash reward withdrawal requests, and so on. The ATM circuit 126 assembles and transmits a customer's desired financial reward operation request to the financial institution computing system 130 which executes the corresponding financial operation. In some arrangements, the ATM circuit 126 ultimately provides the customer with a requested amount of cash in exchange for any financial rewards that the customer has earned through utilization of a credit account with the financial institution. In some arrangements, the ATM circuit 126 ultimately provides the customer with requested financial information (e.g., an account balance). As one of skill in the art would recognize, the ATM circuit 126 may provide the customer with various types of outputs corresponding to information exchanged with the financial institution computing system 130.

The mobile device 114 is a computing system associated with the customer 110. The mobile device 114 includes any type of portable computing device that the customer 110 may use to communicate information with the financial institution computing system 130. In this regard, the mobile device 114 may include any wearable or non-wearable device. Wearable devices refer to any type of device that an individual wears including, but not limited to, a watch (e.g., smart watch), glasses (e.g., eye glasses, sunglasses, smart glasses, etc.), bracelet (e.g., a smart bracelet), etc. The mobile device 114 may also include a phone (e.g., smart phone, etc.), tablet, personal digital assistant, and/or laptop computer.

In the example embodiment shown, the mobile device 114 includes a network interface circuit 116 enabling the mobile device 114 to exchange information over the network, a mobile wallet client application 118, and a mobile input/output ("I/O") device 120. The mobile I/O device 120 includes hardware and associated logics configured to enable the mobile device 114 to exchange information with the customer 110, the financial institution computing system 130, and/or ATM 122 as will be described in greater detail below. An input device or component of the mobile I/O device 120 allows the customer 110 to provide information to the mobile device and may include, for example, a mechanical keyboard, a touchscreen, a microphone, a camera, a fingerprint scanner, any customer 110 input device engageable with the mobile device 114 via a USB, serial cable, Ethernet cable, and so on. An output device or component of the mobile I/O device 120 allows the customer 110 to receive information from the mobile device and may include, for example, a digital display, a speaker, illuminating icons, LEDs, and so on. Further, the mobile I/O device 120 may include assemblies that serve both input and output functions, allowing, for example, the ATM 122 and the financial institution computing system 130 to exchange information with the mobile device 114. Such assemblies include, for example, radio frequency transceivers (e.g., RF or NFC-based transceivers) and other short-range wireless transceivers (e.g., Bluetooth®, laser-based data transmitters, etc.).

The mobile wallet client application 118 is communicably coupled to the financial institution computing system 130 (e.g., the rewards management circuit 134 and the customer database 138) and is structured to permit management of the customer financial accounts and transactions. In some embodiments, the mobile wallet client application 118 may be incorporated with an existing application in use by the financial institution (e.g., a mobile banking application). In some arrangements, the mobile wallet client application 118 is a separate software application implemented on the mobile device 114. The mobile wallet client application 118 may be downloaded by the mobile device 114 prior to its usage, hard coded into the memory of the mobile device or be a web-based interface application such that the mobile device 114 may provide a web browser to the application, which may be executed remotely from the mobile device 114. In the latter instance, the customer 110 may have to log onto or access the web-based interface before usage of the applications. Further, and in this regard, the mobile wallet client application 118 may be supported by a separate computing system including one or more servers, processors, network interface circuits, etc. that transmit applications for use to the computing device. In certain embodiments, the mobile wallet client application 118 includes an API and/or a software development kit (SDK) that facilitate the integration of other applications with the mobile wallet client application 118.

Irrespective of the form that the mobile wallet client application, the mobile wallet client application 118 is structured to enable the customer 110 to create, manage, and interact with a mobile wallet account. While setting up a mobile wallet account, the mobile wallet client application 118 may receive, organize, and store payment tokens from card network computing system 140. The mobile wallet client application 118 may then transmit certain payment tokens to ATM 122 (e.g., via the mobile I/O device 120) as part of any of a variety of transaction requests to complete various financial operations. For example, the mobile wallet client application 118 may receive and display screens from a computing system that operates a mobile wallet platform (e.g., the data exchange circuit 136 at the financial institution computing system 140) on the mobile I/O device 120 including account information, transaction instructions, and so on. In one embodiment, a screen may be used to request a customer name, password, and PIN information from the customer as well as information sufficient to identify a target account (e.g., to identify a payment token associated with the credit card 112) and a desired transaction type (e.g., a reward withdrawal).

An illustrative implementation of the reward redemption system 100 including the mobile wallet client application 118 can be described as follows. The customer 110 downloads and installs the mobile wallet client application 118 on the mobile device 114. The mobile wallet client application 118 is communicatively coupled to the data exchange circuit 136 of the financial institution computing system 130 which is configured to provide the customer 110 with displays including all accounts held by the customer 110 at the financial institution. Accordingly, the customer 110 is presented with a display that includes a depiction of an account associated with the credit card 112. The customer 110 then selects the account associated with the credit card 112 and the mobile wallet client application 118 is configured to communicate the selection to the financial institution computing system 130. Responsive to the customer selection, the data exchange circuit 136 transmits account identifying information (e.g., a PAN) to the card network computing system 140 which generates (e.g., via the token provisioning circuit 144) a payment token for the customer 110 and communicates the token back to the financial institution computing system 130 over the network 150. It should be noted that, as described herein, in certain arrangements, the data exchange circuit 136 may perform all of the functions described herein with reference to the card network computing system 140. The data exchange circuit 136 then transmits the generated token to the mobile device 114.

After the token information is stored on the mobile device 114, the customer 110 then walks up to the ATM selects the payment token via the mobile wallet client application 118 and causes the mobile device 114 to transfer the payment token to the ATM 122. Transferring the token may be accomplished through complementary contactless data transfer devices at the ATM 122 and the mobile device 114. For example, an NFC device included in the mobile I/O device 120 can be used to wirelessly transfer the token to a receiving NFC device included in the ATM I/O device 126. In some arrangements, the transmission of the payment token "wakes up" the ATM 122 from a sleep or standby mode (e.g., where a display at the ATM 122 passively displays a screensaver or a welcome or instruction screen). Responsive to receiving the token, the ATM circuit 126 may be configured to request additional information from the customer and transmit information to the financial institution computing system 130 for authenticating the customer, as will be described in greater detail below.

Figure 2:
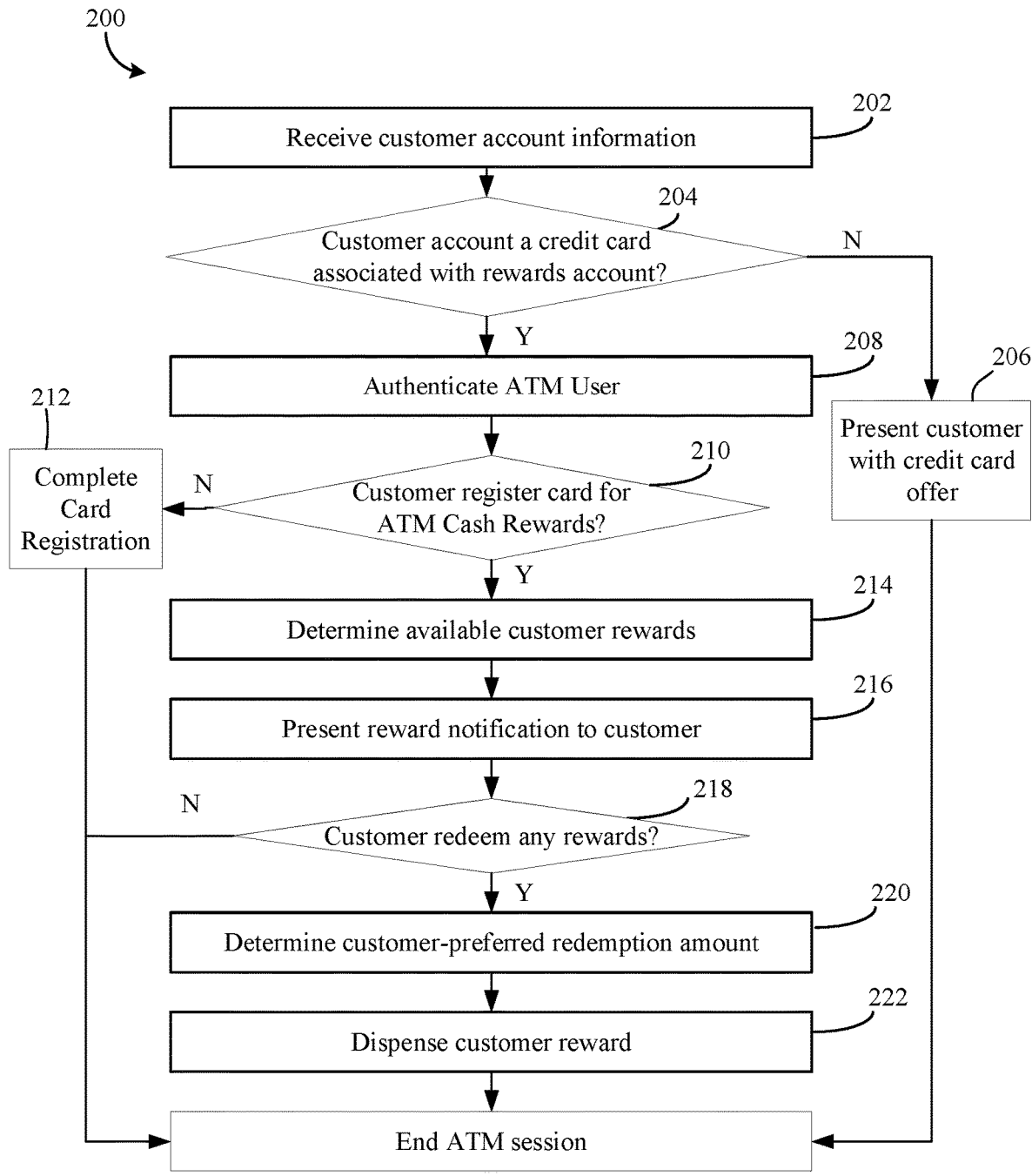
FIG. 2 is a flow diagram of a method for exchanging customer credit rewards for cash at an ATM according to an example embodiment.

Referring now to FIG. 2, a flow diagram of a method 200 for redeeming financial rewards is shown according to an example embodiment. The method 200 may be performed by processing and storage hardware at the financial institution computing system 130 (e.g., the financial institution computing system 130), as executed by one or more circuits (e.g., the data exchange circuit 136 and the rewards management circuit 134) configured to perform the functions described below.

Customer account information is received at 202. In various arrangements, the financial institution computing system 130 may receive the information from the ATM 122 over the network 150. In some arrangements, the information includes account identifying information associated with the customer 110. In some arrangements, the customer 110 inputs the information into the ATM 122 through the ATM I/O device 128. For example, the customer 110 may insert the credit card 112 into the ATM I/O device 128 (e.g., through the card reader 129). Upon receiving the credit card 112, the ATM I/O device 128 may be configured to transmit an account number (e.g., a PAN) to the ATM circuit 126, which is configured to determine that the account number is associated with the financial institution and transmit the account identifying information to the financial institution computing system 130 over the network 150. In some arrangements, the ATM circuit 126 is further configured to present the customer 110 with displays on the ATM I/O device 128 instructing the customer to input authentication information (e.g., a PIN associated with the credit card 112). Authentication information input by the customer 110 is then communicated to the ATM circuit 126 which packages the information with the account number to create a transaction request, which is transmitted to the financial institution computing system 130 via the network interface circuit 124.

In some arrangements, the customer authentication credentials are received through a combination of the ATM I/O device 128 and the mobile device 114. For example, the mobile device 114 may be preconfigured with a mobile wallet client application 118 and thus have a payment token corresponding to the customer account stored thereon. The customer 110 approaches the ATM 122 and allows the mobile device 114 (e.g. by NFC data transmission) to communicate with the ATM circuit 126 via the mobile I/O device 120 of the mobile device 114 and the ATM I/O device 128. The payment token may then be transferred to either the financial institution computing system 130 or the card network computing system 140 for further processing, as discussed above. To provide an illustrative example, in one arrangement, the card network computing system 140 then detokenizes the payment token (e.g., using token mapping data stored in the token database 146), identifies the PAN of the customer, and transmits the credentials to the financial institution computing system 130 for processing.

It is determined if the received account information is associated with a credit card having financial rewards associated therewith at 204. In some arrangements, the rewards management circuit 134 receives the account identifying information transmitted by the ATM 122 via the network interface circuit 132, retrieves information associated with the account from the customer database 138, and determines whether there are any financial rewards associated with the account identifying information.

If there are no rewards associated with the input account identifying information, the customer 110 is presented with a credit card offer interface at 206. For example, upon the rewards management circuit 134 determining that the received account information has no financial rewards, the rewards management circuit 134 may be further configured to transmit a credit card application interface to the ATM 122 for review by the customer 110 via the ATM I/O device 128. In another arrangement, rather than presenting the customer 110 with an application interface, the customer 110 is presented with advertisements notifying the customer 110 of the financial institution available credit cards and associated financial reward programs.

The customer 110 is authenticated at 208. In some arrangements, where, for example, only account identifying information is received, the rewards management circuit 134 is configured to transmit an authentication information request to the ATM 122 over the network 150. Upon receipt of the authentication information request, the ATM circuit 126 is configured to present the customer with a display on the ATM I/O device 128 prompting the customer to input authentication information (e.g., a PIN) associated with the received account information at 202. Authentication information input by the customer via the ATM I/O device 128 is communicated to the ATM circuit 126 which may in turn transmit the authentication information to the financial institution computing system 130 over the network 150. The rewards management circuit 134 receives the authentication information and determines whether the authentication information entered by customer matches credentials associated with the account stored in the customer database 138.

It is determined if the credit card is registered for an ATM cash rewards program at 210. In some arrangements, the customer's registration status is stored in the customer database 138 and the rewards management circuit 134 is configured to retrieve the customer's registration status. If the customer 110 has not registered, then the rewards management circuit 134 may be configured to initiate a credit card registration process at 212 that will be described in greater detail below with reference to FIG. 3. If, however, the credit account is registered, then the method 200 continues.

The customer's available reward balance is determined at 214. In one arrangement, customer financial reward information is maintained at the customer database 138 by the rewards management circuit 134 at the financial institution computing system 130. The rewards management circuit 134 is configured to retrieve customer financial reward information and determine whether the customer 110 has earned any financial rewards through utilization of account associated with the credit card 112. If the customer has earned rewards, the rewards management circuit 134 may be further configured to convert whatever form that the reward normally takes (e.g. points or airline miles) into a currency value in accordance with parameters set by the financial institution.

A reward notification is presented to the customer 110 at 216. In some arrangements, the reward notification is generated by the rewards management circuit 134 responsive to the customer reward determined at step 214. The reward notification includes a graphical interface that is transmitted to the ATM 122 or the mobile device 114 over the network 150. In one arrangement, the reward notification indicates whatever rewards that the customer has earned through utilization of the account associated with the credit card 112 and further indicates the cash value of any such earned rewards to the customer 110. This reward notification may be relayed via the network 150 to the ATM 122 for display via the ATM I/O device 128. In some arrangements, the reward notification also contains graphics giving the customer 110 the ability to indicate whether they wish to redeem the earned rewards (or any portion thereof) for cash.

It is determined if the customer 110 redeemed any rewards at 218. In some arrangements, the ATM I/O device 128 receives reward redemption information input by the customer 110 on the reward notification generated at 216. In some arrangements, the ATM circuit 126 is configured to assess the reward redemption information to determine if the customer 110 indicated a wish to redeem a portion of the reward balance determined at 214. In some arrangements, the ATM circuit 126 is configured to transmit the received reward redemption information to the financial institution computing system 130 over the network 150 and the reward management circuit 134 is configured to determine if the customer 110 indicated a wish to redeem financial rewards. In some arrangements, if the customer 110 did not indicate a wish to redeem rewards, the method 200 ends.

A customer-preferred redemption amount is determined at 220. In some arrangements, if the customer 110 indicates a reward redemption preference, the ATM circuit 126 is configured to formulate a transaction request reflecting the portion of the financial rewards that the customer 110 indicated that they wish to redeem. The ATM circuit 126 may then transmit this transaction request over the network 150 to the financial institution computing system 130, where the data exchange circuit 136 or rewards management circuit 134 of the financial institution computing system 130 processes the transaction request to determine the redemption amount. The transaction request generated may include a specified transaction type (in this instance, a cash withdrawal), one or more corresponding transaction parameters (e.g., an amount to be withdrawn), and the specified financial account (e.g. the financial account through which the customer 110 was authenticated at 208).

Rewards are dispensed to the customer at 222. In some arrangements, the data exchange circuit 136 completes the transaction based on the transaction request received at 220 and information in the customer database 138. For example, where the transaction request includes a withdrawal of all earned financial rewards, the data exchange circuit 136 accesses reward balance information associated with the credit account linked to the account identified in the customer database 138, adjusts bookkeeping entries, and transmits an approval and confirmation to the ATM 122 over the network 150. Responsive to the approval and confirmation, the ATM circuit 126 communicates with circuitry associated with a cash dispenser included in the ATM I/O device 128, and an amount of currency corresponding to that in the transaction request is dispensed to the customer 110.

Figure 3:
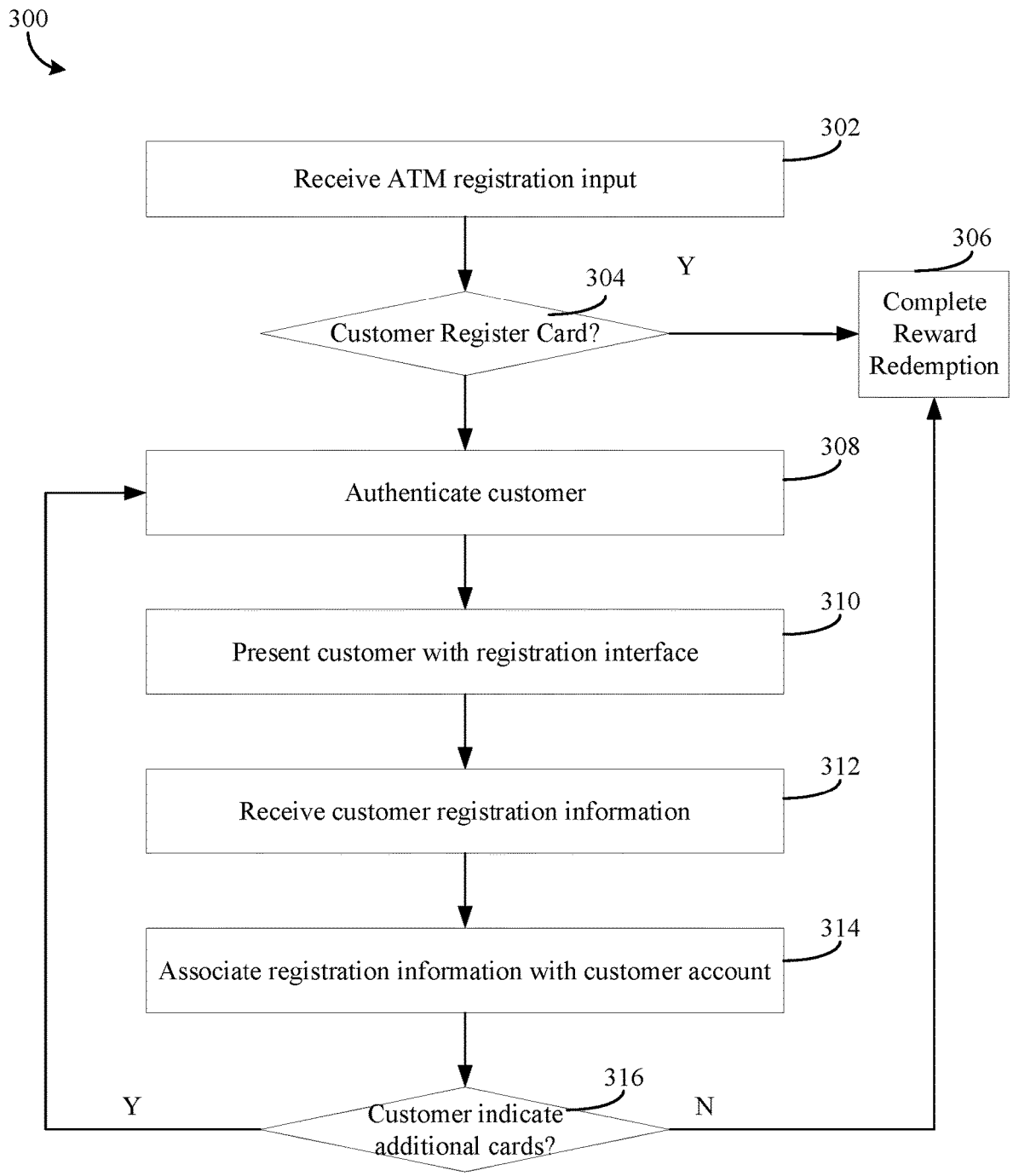
FIG. 3 is a flow diagram of a method for registering a customer credit card for an ATM cash redemption program according to an example embodiment.

Referring now to FIG. 3, a method 300 of registering a customer payment account for an ATM cash redemption program is shown according to an example embodiment. The method 300 is performed by processing and storage hardware at the financial institution computing system 130. It should be understood that the initiation of the method 300 may take a variety of forms. For example, method 300 may be initiated responsive to the financial institution computing system 130 determining that that the account associated with the credit card 112 of the customer 110 is not registered (for example, at 210 in the method 200 above).

In some arrangements, the method 300 may be initiated responsive to the customer 110 indicating a wish to register a credit card 112 for an ATM cash redemption program during an ATM session at the ATM 122. The ATM session may be associated with another payment account held by the customer 110 at the financial institution, or it may be a session engaged in the customer 110 solely for the purpose of registering the credit card for the ATM cash rewards program. To provide an illustrative example, the customer 110 may have initiated an ATM session using a debit card issued by the financial institution. In the session, the customer may have indicated (e.g., via the ATM I/O device 128) a preference to register a different payment account (e.g., the one associated with the credit card 112) for an ATM cash redemption program. Responsive to this preference, the ATM circuit 126 is configured to generate instructions, displayed through the ATM I/O device 128 corresponding to the method 300.

A registration input is received at 302. In some arrangements, this registration input may include the receipt of account identifying information or customer credentials corresponding to a credit card not registered for the ATM cash redemption program (e.g. in the steps 202-208 discussed above relating to the method 200). In some arrangements the registration input includes credit account identifying information (e.g. a credit card number) received from either the ATM I/O device 128 or the mobile device 114. In some arrangements, the registration input is received during an ATM session at the ATM 122 initiated through payment account other than the account associated with the credit card 112 (e.g., a debit card). Upon receipt of the account identifying information, the ATM circuit 126 is configured to relay this information to the financial institution computing system 130 for assessment by the rewards management circuit 134, which determines whether the account information received is associated with a credit card rewards account and, if so, generates graphical interfaces to be relayed to the ATM 122 for display to the customer 110 for carrying out the additional steps of the method 300 described below. In some arrangements, the registration input may take the form of a customer input received from the ATM I/O device 128 indicating a desire to register a credit card.

It is determined if the customer 110 has already registered the account associated with the credit card 112 at 304. In some arrangements, based on the account identifying information received at 302, the financial institution computing system 130 uses similar circuitry and methodologies as discussed in relation to the step 204 of method 200 discussed in relation to FIG. 2. In some arrangements, if the customer 110 has already registered the credit account, then the rewards management circuit 134 is configured to transmit a notification to the ATM 122 for presentation to the customer. In some arrangements, responsive to it being determined that the customer 110 has already registered the credit account, the rewards management circuit 134 is configured to initiate the method 200 discussed above at 306 to enable the customer 110 to redeem any earned financial rewards for cash. If the customer has not registered the credit account for the ATM cash redemption program, then the method 300 continues.

The customer is authenticated at 308. In some arrangements, when the registration input received at 302 includes both customer credentials (e.g., credentials associated with another payment account, such as a debit card, of the customer 110) and credit account identifying information, the rewards management circuit 134 determines whether the customer credentials (e.g., a PIN entered by customer 110 associated with the debit account via the ATM I/O device 128) matches customer credentials stored in the customer database 138. In some arrangements, where the registration input includes solely credit account identifying information, for example, authentication requires additional information from the customer 110. For example, responsive to just receiving account identifying information (i.e., when the customer 110 simply enters the credit card 112 into the ATM I/O device 128), the rewards management circuit 134 is configured to transmit instructions to the ATM 122, which may configure the ATM circuit 126 to present displays to the customer 110 via the ATM I/O device 128 that prompt the customer 110 to input customer-specific information (e.g., date of birth, social security number, etc.) that can be cross referenced with information stored in the customer database 138 for authentication. In some arrangements, the ATM circuit 126 receives the customer-specific information and transmits the information to the financial institution computing system 130. The information may then be assessed by the rewards management circuit 134 to determine whether the received customer-specific information matches customer information stored in the customer database 138.

The customer 110 is presented with a registration interface at 310. In some arrangements, responsive to the customer 110 being authenticated, the rewards management circuit 134 is configured to generate a registration interface prompting the customer 110 to input registration information. The displays may be transmitted to the ATM 122 over the network 150 and presented to the customer 110 via the ATM I/O device 128. In some arrangements, the registration information requested from the customer 110 may include credit account identifying information. For example, if credit account identifying information has not yet been obtained (e.g., from the actual credit card 112 itself or the mobile device 114 through a mobile wallet client application 118), the registration interface may include instructions prompting the customer 110 to insert the credit card 112 into the ATM I/O device 118 or to tap the mobile device 114 to transmit a token. In some arrangements, the registration interface instructs the customer 110 to establish authentication credentials to be associated with the credit account. For example, the registration information may request the customer 110 to establish a PIN that can be used to authenticate the customer 110. In some arrangements, the registration interface may also include a registration confirmation query, which requests a customer 110 to confirm a preference of the customer 110 to register the credit account for the ATM cash redemption program.

In some arrangements, the registration interface instructs the customer 110 to indicate if they have a preference to identify any additional credit accounts for the ATM cash redemption program. In some arrangements, the rewards management circuit 134 is configured to identify additional credit accounts associated with the customer 110 based on information stored in the customer database 138, and the registration interface identifies the additional credit accounts and provides the customer 110 with the ability to indicate a preference to register at least one of the additional credit accounts for the ATM cash redemption program. In some arrangements, the registration interface identifies the financial reward programs that are associated with the credit card 112.

Customer registration information is received at 312. In some arrangements, the customer 110 inputs the information requested by the registration interface generated at 310 via the ATM I/O device 128. The ATM circuit 126 receives the input information, and transmits the input information to the financial institution computing system 130 over the network 150.

The registration information is associated with a customer account at 314. In some arrangements, the rewards management circuit 134 is configured to store the registration information received at 312 in the customer database 138 in association with the credit account of the customer.

It is determined if the customer 110 indicated a preference to register additional credit cards for the ATM cash program at 316. In some arrangements, the rewards management circuit 134 is configured to assess the customer registration information received at 312 to determine if the customer 110 indicated such a preference. In some arrangements, after the customer 110 has registered a first credit account for the ATM cash withdrawal program, the rewards management circuit 134 is configured to identify additional credit accounts that the customer 110 has and to transmit an additional registration interface identifying the additional credit account to the ATM 122 for presentation to the customer 110.

If the customer 110 has indicated a preference to register additional credit accounts for the ATM cash redemption program, then the ATM circuit 126 may configured to revert back to 316 and generate a registration interface prompting the customer 110 to input any additional information necessary (using the systems and methods discussed above) to register a second credit account for the ATM cash redemption program. If, however, the customer 110 has not indicated any preference to register additional credit accounts, then the ATM circuit 126 may be configured to initiate the method 200 at 306 to enable the customer to redeem any earned financial rewards associated with the newly registered credit account.

Figure 4A:
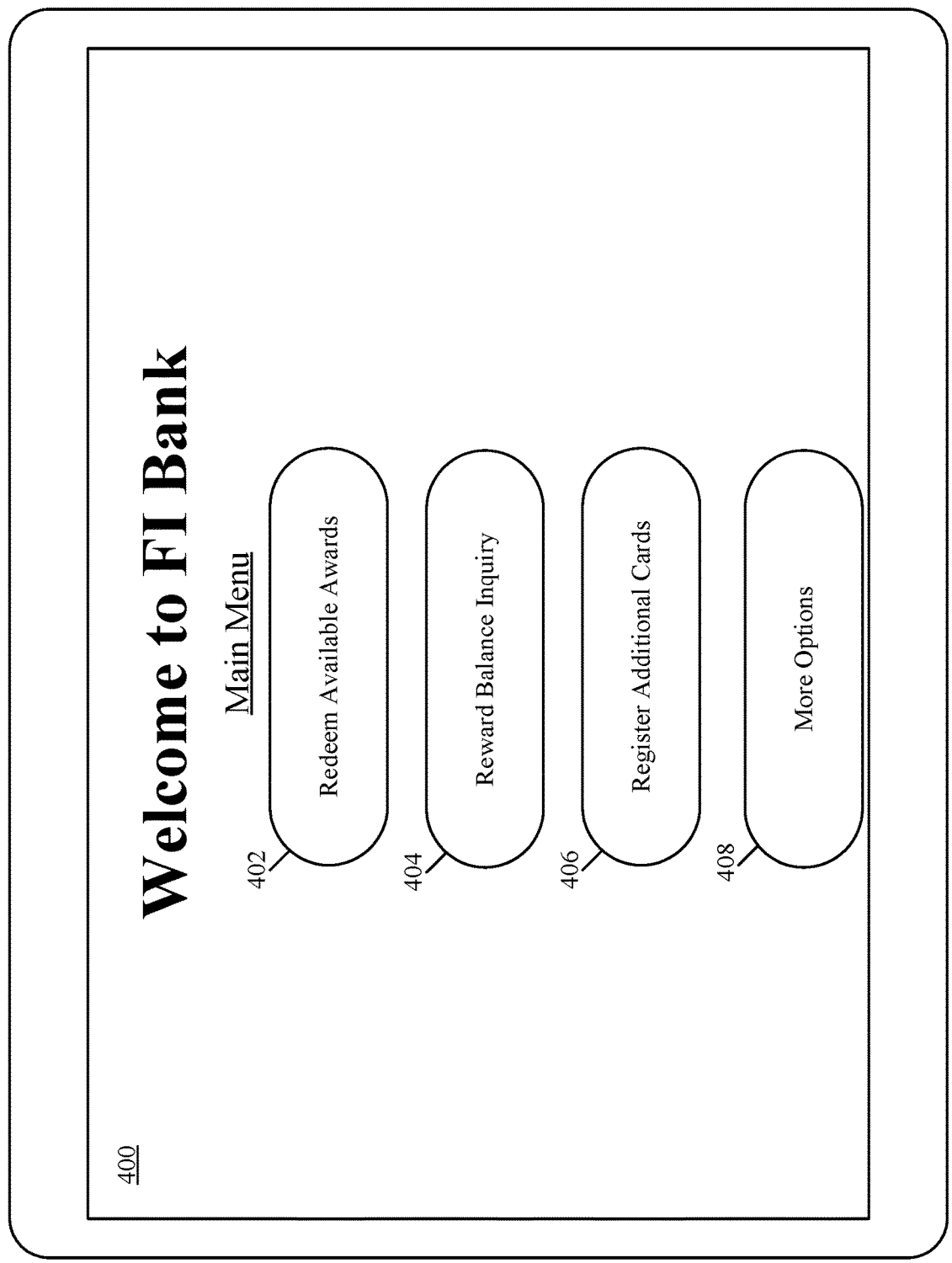
FIGS. 4A-4D are example screens generated on a graphical interface at an ATM, according to example embodiments.

Referring now to FIG. 4A, an interface 400 on a display included in the ATM I/O device 128 is shown. In some arrangements, the interface 400 is presented after the customer 110 inputs authentication information (e.g., at the step 202 at the method 200 displayed in FIG. 2) via the ATM I/O device 128. As shown, the interface 400 includes a reward redemption button 402, a reward balance inquiry button 404, a register additional cards button 406, and a more options button 408. Selecting the redeem available awards button 402 allows the customer 110 to select a financial reward associated with the credit card 112 and to exchange currency for any portion of the selected financial reward. Selecting the reward balance inquiry button 404 allows the individual to receive information relating to account various financial awards that the customer 110 has in relation to the credit account. Selecting the register additional cards button 406 allows the customer 110 to register additional credit accounts (e.g., by the process 300 displayed in FIG. 3) for the ATM cash redemption program. Selecting the more options button 408 allows the customer 110 to access additional functions of the ATM 122 that are not shown on the interface 400. One option could be for the customer 110 to pair the mobile device 114 with the ATM 122.

Figure 4B:
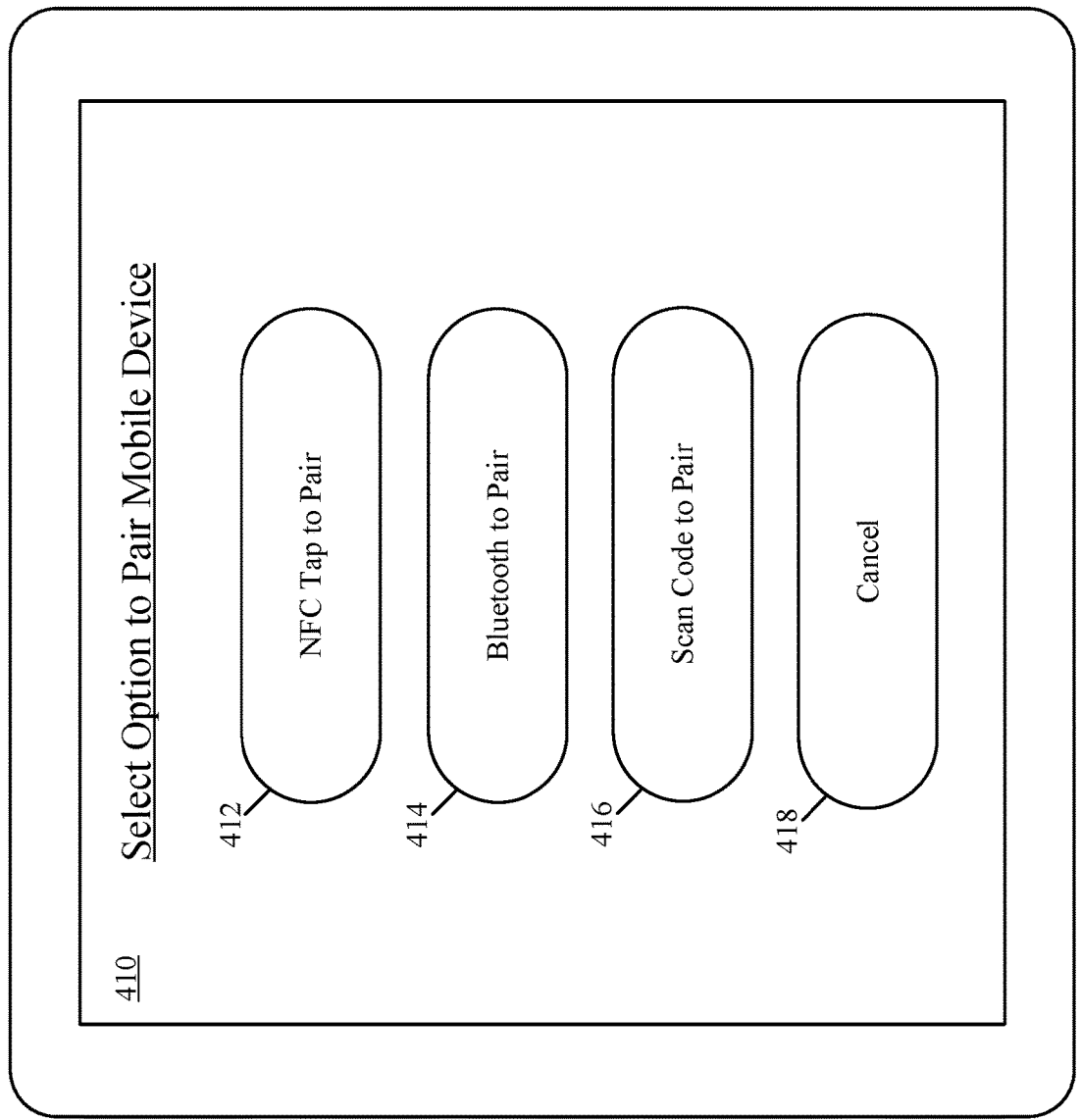

In FIG. 4B, an interface 410 on a display included in the ATM I/O device 128 is shown according to an example embodiment. In some arrangements, the interface 410 is presented after the customer 110 selects an option to pair the mobile device 114 to the ATM 122 after hitting the other options button 408 displayed in FIG. 4A. The interface 410 includes an NFC tap to pair button 412, a Bluetooth® tap to pair button 414, a scan code to pair button 416, and a cancel button 418. The cancel button 418, in one arrangement, causes the ATM 122 to return to the start screen 400 displayed in FIG. 4A. The NFC tap to pair button 412 causes the ATM 122 to establish a connection through a NFC transceiver to the mobile device 114 for data communication between the ATM 122 and the mobile device 114 (e.g., the transmittal of a payment token to the ATM 122). The Bluetooth® tap to pair button 414 causes the ATM 122 to establish a communication through a Bluetooth® connection to the mobile device 114. The scan code to pair button 416 causes the ATM 122 to display a barcode (e.g., a QR code) that can be scanned by a camera associated with the mobile device 114. In some arrangements, the barcode launches a website to be used as a secure data portal for communication with the ATM 122 or the financial institution computing system 130.

Figure 4C:
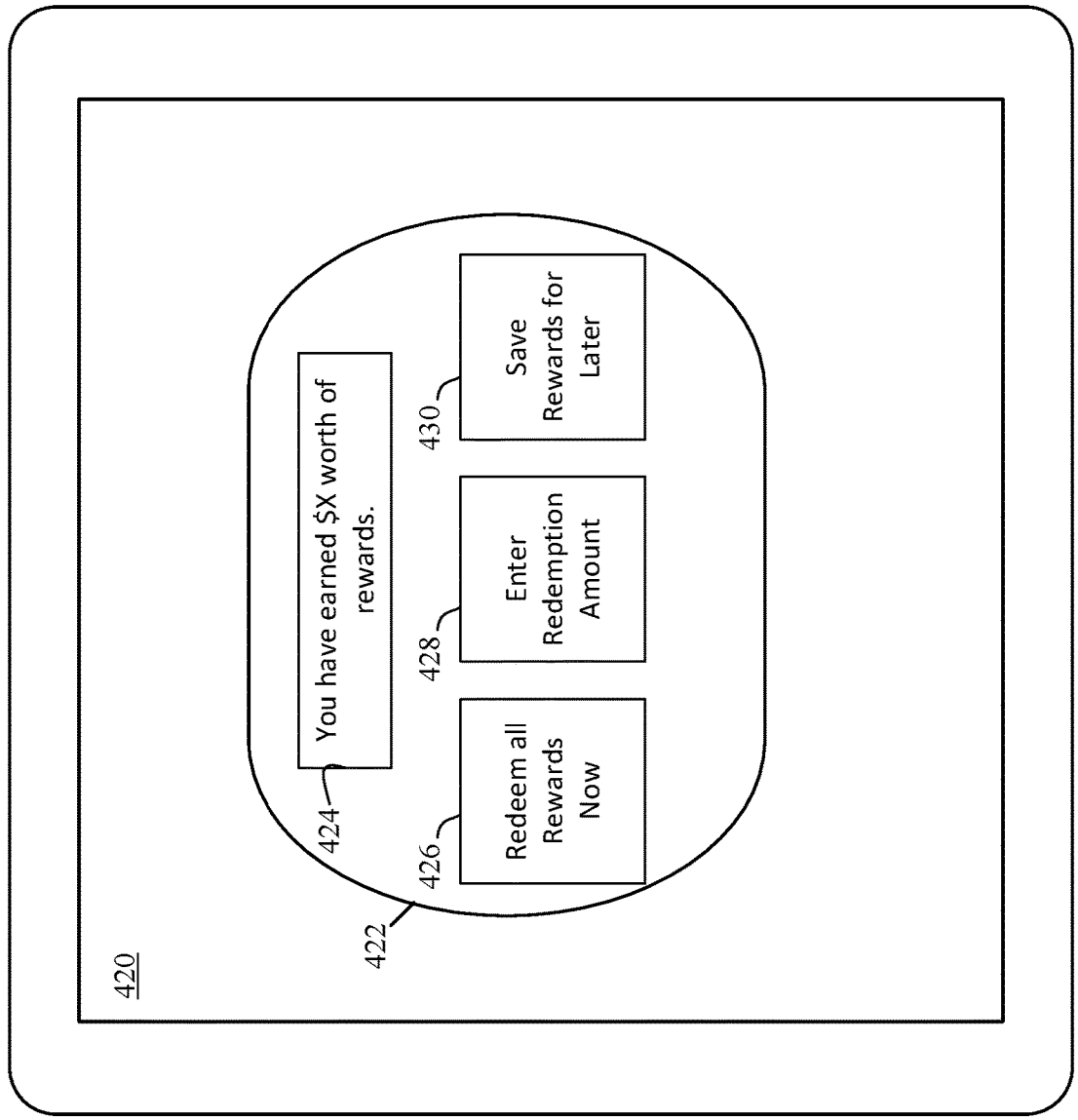

Referring now to FIG. 4C, an interface 420 on a display included in the ATM I/O device 128 of an ATM 122 is shown according to an example embodiment. In some arrangements, the interface 420 is displayed based on the financial institution computing system 130 determining that the customer 110 has registered the credit card 112 for the ATM cash redemption program and that the customer 110 has available rewards to redeem (e.g., at 216 in the method 200 displayed in FIG. 2). Alternatively, the interface 420 is displayed responsive to the customer 110 selecting the reward balance inquiry button 404 displayed in FIG. 4A. The interface 420 includes a window 422 having a reward notification 424, a complete reward redemption button 426, a portion reward redemption button 428, and a reward denial button 430. The reward indication 424 indicates a cash value of earned financial rewards of the customer. The reward indication 424 can also include other values (points, airfare mileage, etc.) indicating the total amount of earned financial rewards. The complete reward redemption button 426 enables the customer 110 to exchange the indicated amount of currency for earned financial rewards. The portion rewards redemption button 428 enables the customer 110 to input a portion of the indicated value of the earned by the customer 110. In some arrangements, the portion rewards redemption button 428 enables the customer 110 to indicate any cash value that is less than that indicated by the reward indication 424. Upon customer selection of this button, a notification may be relayed to the financial institution computing system 130 for processing by the rewards management circuit 134 to update the reward account balance of the customer in a manner that correlates with the portion of the reward that the customer 110 chose to redeem for cash at the ATM 122. The reward denial button 430 enables the customer 110 to not redeem any of the earned financial rewards at the ATM 122.

Figure 4D:
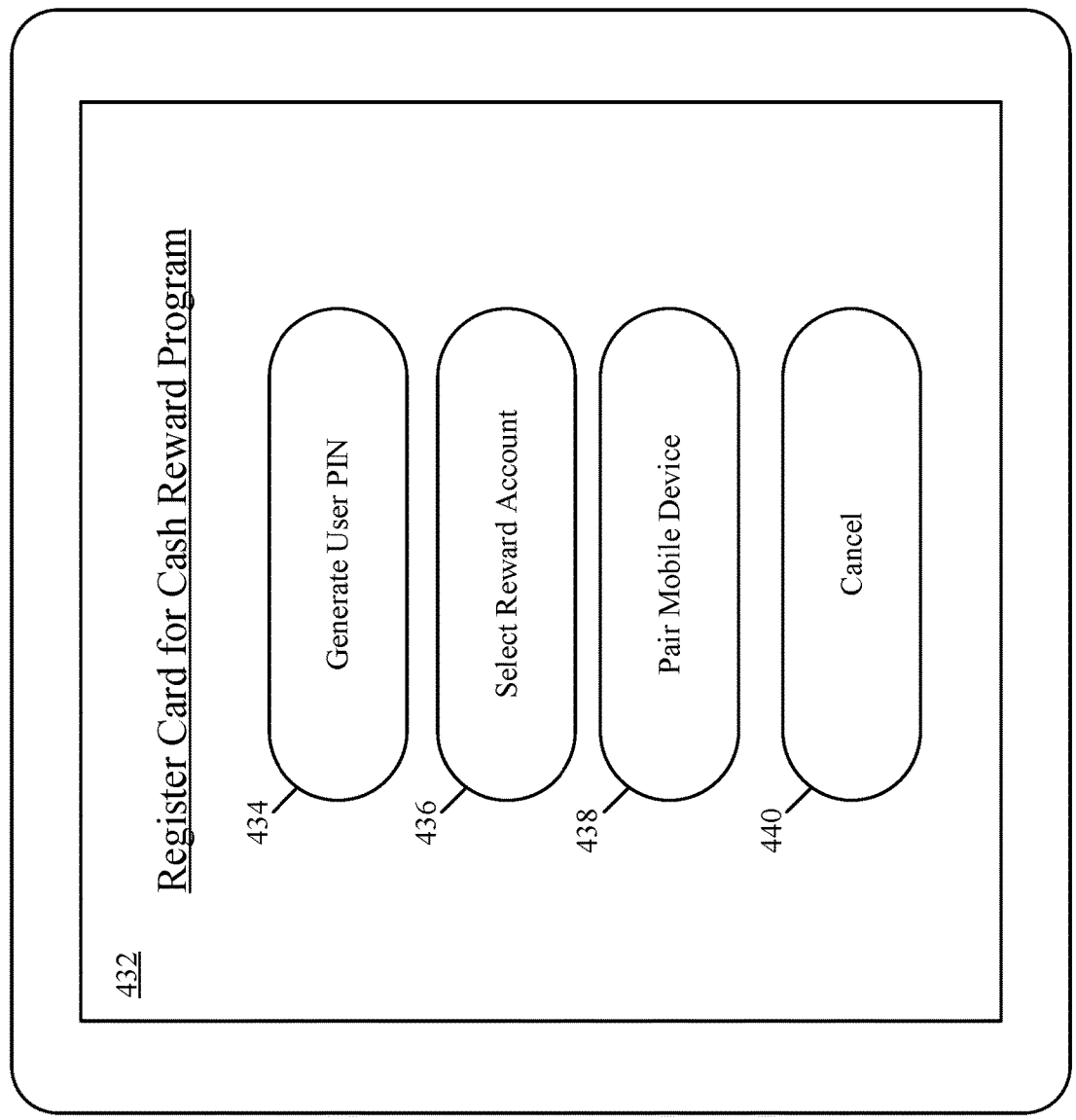

Referring now to FIG. 4D, an interface 432 on a display included in the ATM I/O device 128 of an ATM 122 is shown according to an example embodiment. In some arrangements, the interface 432 may be shown to the customer 110 upon selection of the register additional cards button 406 displayed in FIG. 4A. In some arrangements, the interface 432 may be presented to the customer as the registration interface (e.g., in the step 310 of the method discussed above in relation to FIG. 3). The interface 432 includes a generate customer PIN button 434, a reward account selection button 436, a pair mobile device button 438, and a cancel button 440. The cancel button 440 cancels the registration methods described herein. The reward account selection button 436 allows the customer 110 to select a particular financial reward program to register for ATM cash withdrawals. Upon selection of the reward account selection button 436, the customer 110 may be further brought to another interface displaying all of the customer financial reward information (retrieved from, e.g., the customer database 138 via the rewards management circuit 134) so as to enable the customer 110 to choose a particular reward account. The generate customer PIN button 438 enables the customer 110 to layer an additional layer of authentication onto any unregistered credit card. Selection of the generate customer PIN button 526 brings the customer 110 to a screen prompting the customer 110 to input and confirm a PIN (e.g., via a keyboard of the ATM I/O device 128) to be paired with the unregistered credit card. The confirmed pin will be later used to authenticate the customer 110 in making cash reward withdrawals (e.g., in the methods 200 and 300). The pair mobile device 438 enables the customer to communicatively couple the mobile device 114 with the ATM 122 (using any relevant methodologies discussed above) so that the customer 110 can select a credit card that they wish to register for the ATM cash reward program via the mobile wallet client application 118 so that tokenized identifying information associated with the card can be transmitted to the financial institution computing system 130 for registration. Selection of the pair mobile device button 528 may bring to the interface discussed in FIG. 4B above, enabling the customer 110 to use multiple methods to pair the mobile device 114 to the ATM 122.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The term "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 4D NAND, NOR, 4D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. An automated teller machine (ATM) comprising:
a network interface;
an input/output device configured to exchange data with a customer; and
a processing circuit comprising a processor and memory, the memory structured to store instructions that are executable by the processor and cause the processing circuit to:
  receive, through the input/output device, credit account information identifying a credit account associated with the customer;
  transmit, through the network interface, the credit account information identifying the credit account;
  receive, through the network interface, financial reward information associated with the credit account, the financial reward information including a currency value;
  determine, based on the financial reward information, whether the credit account is registered for a cash redemption program;
  display, through the input/output device in response to determining that the credit account is not registered for the cash redemption program, a first graphical user interface providing the customer with an ability to establish a secure identifier for the credit account;
  display, through the input/output device, a second graphical user interface comprising a reward indication that includes the currency value and providing the customer with an ability to indicate a preference to perform a currency reward withdrawal associated with a portion of the currency value;
  detect, through the input/output device, an input by the customer into the second graphical user interface, the input comprising an indication of the preference of the customer to perform the currency reward withdrawal;
  transmit, through the network interface, a financial reward redemption request based on the indicated preference;
  receive, through the network interface, a reward redemption request authorization; and
  dispense, through the input/output device, an amount of currency corresponding to an amount identified in the reward redemption request authorization.

2. The automated teller machine of claim 1, wherein the indicated customer preference includes a portion of a financial reward amount identified in the financial reward information.

3. The automated teller machine of claim 1, further configured to:

receive data indicative of an interaction of the customer with the ATM through the input/output device;

initiate a customer ATM session responsive to the data indicative of the interaction.

4. The automated teller machine of claim 3, wherein the data indicative of the interaction is tokenized and received from a computing device associated with the customer.

5. The automated teller machine of claim 3, wherein the data indicative of the interaction includes an account number associated with the credit account.

6. The automated teller machine of claim 1, further configured to:

display an instruction for an input comprising authentication information;

receive the authentication information; and generate a transaction request comprising the authentication information and the credit account information.

7. The automated teller machine of claim 1, further configured to present a plurality of buttons, the plurality of buttons comprising:

a reward redemption button structured to commence a reward redemption process;

a reward balance inquiry structured to present financial award information; and a register additional cards button structured to commence a credit account registration process.

8. The automated teller machine of claim 1, further configured to register the credit account associated with the customer.

9. A computer-implemented method, comprising:

receiving, by an automated teller machine (ATM), credit account information identifying a credit account associated with a customer;

transmitting, by the ATM, the credit account information to a financial institution computing system;

receiving, by the ATM, financial reward information associated with the credit account, the financial reward information including a currency value;

determining, by the ATM based on the financial reward information, whether the credit account is registered for a cash redemption program;

displaying, by the ATM in response to determining that the credit account is not registered for the cash redemption program, a first graphical user interface providing the customer with an ability to establish a secure identifier for the credit account;

displaying, by the ATM, a second graphical user interface comprising a reward indication that includes the currency value and providing the customer with the ability to indicate a preference to perform a currency reward withdrawal associated with a portion of the currency value;

detecting, by the ATM, an input by the customer into the second graphical user interface, the input comprising an indication of the preference of the customer to perform the currency reward withdrawal;

transmitting, by the ATM, a financial reward redemption request based on the indicated preference;

receiving, by the ATM, a reward redemption request authorization; and dispensing, by the ATM, an amount of currency corresponding to an amount identified in the reward redemption request authorization.

10. The method of claim 9, wherein receiving, by the ATM, financial reward information includes receiving an account number associated with the credit account.

11. The method of claim 9, further comprising:

displaying, by the ATM, an instruction for an input comprising authentication information;

receiving, by the ATM, the authentication information; and generating, by the ATM, a transaction request comprising the authentication information and the credit account information.

12. The method of claim 9, wherein detecting, by the ATM, the input by the user includes receiving an indication of an amount of earned awards for redemption.

13. The method of claim 12, further comprising generating a reward redemption request associated with the amount of earned awards for redemption.

14. The method of claim 9, further comprising:

receiving, by the ATM, data indicative of an interaction of the customer with the ATM through an input/output device; and initiating, by the ATM, a customer ATM session responsive to the data indicative of the interaction.

15. The method of claim 14, wherein receiving the data indicative of the interaction comprises:

receiving, by the ATM, the data from a computing device associated with the customer; and tokenizing, by the ATM, the data.

\* \* \* \* \*